United States Patent [19]

Inoue et al.

[11] Patent Number: 5,550,185
[45] Date of Patent: Aug. 27, 1996

[54] SILICONE RUBBER COMPOSITION

[75] Inventors: Yoshio Inoue; Masaharu Takahashi; Susumu Sekiguchi; Minoru Igarashi, all of Annaka, Japan

[73] Assignee: Shin-Etsu Chemical Co., Ltd., Tokyo, Japan

[21] Appl. No.: 240,530

[22] Filed: May 10, 1994

[30] Foreign Application Priority Data

May 11, 1993 [JP] Japan ..................... 5-132814

[51] Int. Cl.$^6$ .................... C08L 83/04; C08G 77/06
[52] U.S. Cl. ............ 524/847; 524/862; 524/863; 524/864; 528/18; 528/33; 528/38; 528/41; 528/901
[58] Field of Search ................... 524/862, 863, 524/864, 847; 528/18, 33, 38, 41, 901

[56] References Cited

U.S. PATENT DOCUMENTS

| | | | |
|---|---|---|---|
| 3,644,434 | 2/1972 | Hittmair et al. | 260/375 B |
| 4,100,129 | 7/1978 | Beers | 260/37 SB |
| 4,448,927 | 5/1984 | Falender et al. | 524/863 |
| 4,482,670 | 11/1984 | Saam et al. | 524/863 |
| 4,486,567 | 12/1984 | Bowman et al. | 524/863 |
| 5,179,159 | 1/1993 | Kishita et al. | 524/862 |

*Primary Examiner*—John C. Bleutge
*Assistant Examiner*—Karen A. Dean
*Attorney, Agent, or Firm*—Cushman Darby & Cushman, L.L.P.

[57] ABSTRACT

The silicone rubber composition of the present invention comprises (A) an organopolysiloxane obtained by mixing and heating an organopolysiloxane having a silanol group at both ends of the molecular chain and a silane or a siloxane having two hydrolyzable groups in the molecule, (B) a finely divided silica, and (C) a curing agent. The composition, wherein the content of low-molecule siloxanes is remarkably constrained, is quite useful in the application wherein low-molecular siloxanes are obnoxious, for example, in the application of electrical contacts and parts used adjacent thereto, roll materials of copying machines, gaskets for construction, etc.

9 Claims, No Drawings

SILICONE RUBBER COMPOSITION

BACKGROUND OF THE INVENTION

1. Field of the Invention

The present invention relates to a silicone rubber composition wherein the content of low-molecular siloxanes is very low.

2. Description of the Prior Art

Since silicone rubbers have such excellent properties as weather resistance, electrical properties, low-compressive set, heat resistance, and cold resistance, they are used widely in various fields including electronic equipment, automobiles, construction, medicine, and food. For instance, they are used for rubber contacts that are used as rubber contact keys, for example, of remote controllers, typewriters, word processors, computer terminals, and musical instruments; gaskets for construction; various rolls, such as rolls for copying machines, rolls for development, transfer rolls, electrification rolls, and sheet feeding rolls; rubber vibration insulators for audio apparatuses; and packings for compact discs used in computers.

At present, the demand for silicone rubbers is increasing more and more, development of silicone rubbers having excellent properties is desired, and particularly it is strongly demanded to reduce low-molecular siloxanes contained in silicone rubbers.

For example, in the case of rubber contacts used as contact keys, since low-molecular siloxanes cause a contact failure, it is attempted to reduce the amount of low-molecular siloxanes contained in silicone rubber molded products. Specifically, after rubber contact products are cured, the rubber contact products are heat-treated in an oven at 200° C. for 2 to 24 hours to reduce the amount of low-molecular siloxanes, but such heat treatment results in considerable disadvantage in view, for example, of time, labor, and cost.

Further, in the case of roll materials for copying machines, there is the problem that an offset phenomenon occurs, that is, toner is transferred onto a roller through low-molecular siloxanes. Also, for example, in the case of gaskets for construction, it is known that low-molecular siloxanes remaining in the silicone rubber cause difficulties.

Therefore, various techniques for reducing low-molecular siloxanes contained in silicone rubbers are studied.

As a technique of reducing the content of such low-molecular siloxanes, a technique is known wherein an organopolysiloxane having a high degree of polymerization (hereinafter sometimes called simply a high molecular organosiloxane) used as a major component of a silicone rubber is subjected to stripping at a high temperature of 100° to 300° C. under conditions of reduced pressure. However, since the high molecular organosiloxane is high in viscosity, a large amount of energy and much time are required to remove low-molecular sioxnes securely and therefore there is a limit for practical use.

Further, although there is suggested a technique wherein a high molecular organosiloxane is dissolved in a solvent, such as toluene, to remove low-molecular siloxanes by extraction, this technique makes the process complicated and therefore is industrially quite disadvantageous.

Accordingly, a technique of obtaining a high molecular organosiloxane wherein the amount of low-molecular siloxanes is extremely low is demanded.

As a method of producing a high molecular organosiloxane, for example, U.S. Pat. No. 2,546,036 discloses a method wherein sodium hydroxide is used as a catalyst and a silicone oil having a low molecular weight is treated with a polydimethylsiloxane. Further, U.S. Pat. No. 2,634,252 discloses, as a catalyst used in increasing the polymerization rate and in producing a high molecular organosiloxane good in quality and having a high degree of polymerization, potassium hydroxide, a potassium silanolate, a lithium silanolate, a tetraalkylammonium hydroxide, etc.

However, the high molecular organosiloxane obtained by this method contains a considerable amount (generally 5 to 10% by weight) of cyclic low-molecular siloxanes and a large cost is required to remove them.

Further, U.S. Pat. No. 2,883,366 discloses a method of producing a high molecular organosiloxane using a phosphorus siliconate as a polymerization catalyst, but does not refer to the reduction in low-molecular siloxanes at all. Furthermore, a method of producing a high molecular organosiloxane by using a five-coordinate catalyst or the like is studied, but a high molecular organosiloxane having a high degree of polymerization has not yet been obtained stably.

SUMMARY OF THE INVENTION

Therefore, an object of the present invention is to provide a silicone rubber composition wherein the content of low-molecular siloxanes is remarkably reduced.

According to the present invention, there is provided a silicone rubber composition, comprising (A) an organopolysiloxane obtained by mixing and heating an organopolysiloxane having a silanol group at both ends of the molecular chain and represented by the following general formula (1):

(1)

wherein $R^1$ and $R^2$, which are the same or different, each represent an unsubstituted or substituted monovalent hydrocarbon group and n is an integer of 2 to 3,000, with a member of the group consisting of at least one member of the group consisting of a silane and a siloxane having two hydrolyzable groups in the molecule, (B) a finely divided silica, and (C) a curing agent.

That is, the outstanding feature of the present invention is use of an organopolysiloxane having a high degree of polymerization obtained by condensation polymerization of an organopolysiloxane having a silanol group at both ends of the molecular chain by using a silane or a siloxane having two hydrolyzable groups in the molecule. The organopolysiloxane having a high degree of polymerization, i.e., a high molecular organosiloxane, obtained by this method has a total content of low-molecular siloxanes (having a degree of polymerization of 3 to 25) represented by the following formula (2):

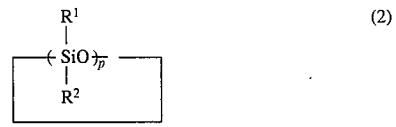

(2)

wherein $R^1$ and $R^2$ have the same meanings as defined above and p is an integer of 3 to 25, of generally 5,000 ppm or less. In particular, in the case where low-molecular siloxanes in the organopolysiloxane represented by the above general formula (1) used as a raw material have been removed satisfactorily, the total content of the above low-molecular siloxanes becomes 2,000 ppm or less, which means that the formation thereof is quite effectively suppressed. In addition, if a silicone rubber composition is prepared by using this high molecular organosiloxane, the content of the low-molecular siloxanes does not increase during the course of the preparation and it becomes possible to obtain a silicone rubber composition having a low content of low-molecular siloxanes stably.

The silicone rubber composition of the present invention is constrained remarkably in content of low-molecular siloxanes and is quite useful in the application wherein low-molecular siloxanes are obnoxious, for example, in the application of electrical contacts and parts used adjacent thereto, roll materials of copying machines, gaskets for construction, etc.

DETAILED DESCRIPTION OF THE INVENTION

Component (A)

Starting Materials:

As a starting material used in the production of Component (A) that is a high molecular organosiloxane, an organopolysiloxane having a silanol group at both ends of the molecular chain and represented by the above general formula (1) is used. In the general formula (1), $R^1$ and $R^2$ each represent an unsubstituted or substituted monovalent hydrocarbon group and specific examples thereof include an alkyl group, such as a methyl group, an ethyl group, and a propyl group, an alkenyl group, such as a vinyl group and a allyl group, a cycloalkyl group, such as a cyclohexyl group, an aryl group, such as a phenyl group and a tolyl group, an aralkyl group, such as a benzyl group and a phenylethyl group, and corresponding substituted groups that are formed by replacing part or all of the hydrogen atoms of the above groups by halogen, cyano, or the like, such as a chloromethyl group, a trifluoropropyl group, a cyanoethyl group, and an α-cyanophenylethyl group. Among these groups, preferable groups are methyl, vinyl, phenyl and trifluoropropyl groups.

n is an integer representing the degree of polymerization and is an integer of 2 to 3,000, with preference given to an integer of 10 to 1,000 from an economical point of view.

With a view to suppressing the amount of low-molecular siloxanes, in the present invention, among the above organopolysiloxanes, organopolysiloxanes wherein cyclic siloxanes that do not take part in the polymerization are removed as much as possible by a removing operation, for example, by stripping (generally to an amount of 2,000 ppm or less) are preferably used and most preferably organopolysiloxanes obtained by ring-opening polymerization of cyclic trisiloxane are used.

Production of Siloxane Gums:

The high molecular organosiloxane used as Component (A) in the present invention is obtained by condensation polymerization of the raw material, the above organopolysiloxane.

In this condensation polymerization, it is important to use a silane or a siloxane having two hydrolyzable groups in the molecule and by the use of that it becomes possible to obtain a high molecular organosiloxane with the formation of low-molecular siloxanes effectively being suppressed. The silane and the siloxane may be used in combination, and these may contain a silane or siloxane having one or three hydrolyzable groups in a small amount.

Such hydrolyzable groups include various hydrolyzable groups and in the present invention, for example, a dialkylamino group, an amide group, and an ester group are preferable. Silanes and siloxanes having two such hydrolyzable groups include those represented by the following general formulas (3) to (6):

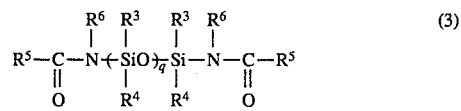

(q is an integer of 0 to 100),

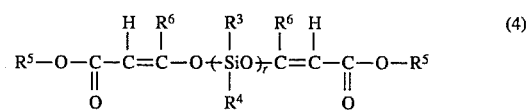

(r is an integer of 1 to 100),

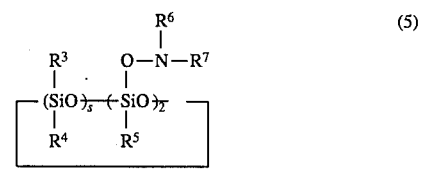

(s is an integer of 2 to 10)

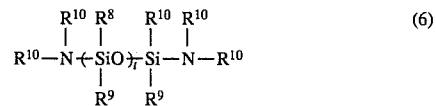

(t is an integer of 0 to 1,000).

In the above formulas, $R^3$ to $R^{10}$ each represent an unsubstituted or substituted monovalent hydrocarbon group and specifically examples thereof are the same groups as the groups mentioned as examples of $R^1$ in the above general formula (1), with preference given to an alkyl group having 5 or less carbon atoms, a vinyl group, a tripropyl group, and a phenyl group. In particular, most preferably $R^{10}$ represents an alkyl group having 4 or less carbon atoms.

Typical examples of the silane and siloxane represented by the above material formula (3) are the following:

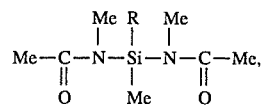

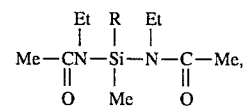

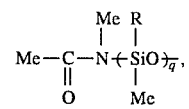

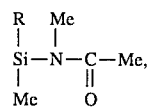

-continued

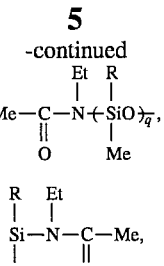

wherein in the formulas above R represents a methyl group, a vinyl group, a trifluoropropyl group, or a phenyl group, and q' is an integer of 1 to 100.

Typical examples of the silane or siloxane represented by the above general formula (4) are the following:

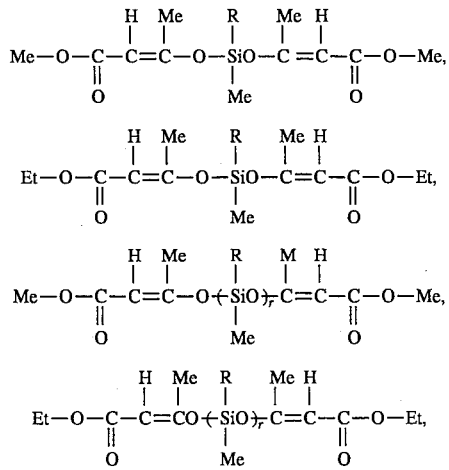

wherein in the formulas above R represents a methyl group, a vinyl group, a trifluoropropyl group, or a phenyl group, and r is an integer of 1 to 100.

Typical examples of the silane or siloxane represented by the above general formula (5) are the following:

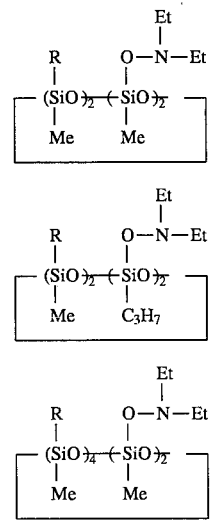

-continued

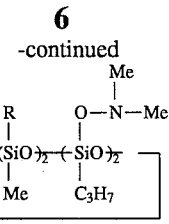

wherein in the formulas above, R represents a methyl group, a vinyl group, a trifluoropropyl group, or a phenyl group.

Typical examples of the silane or siloxane represented by the above general formula (6) are the following

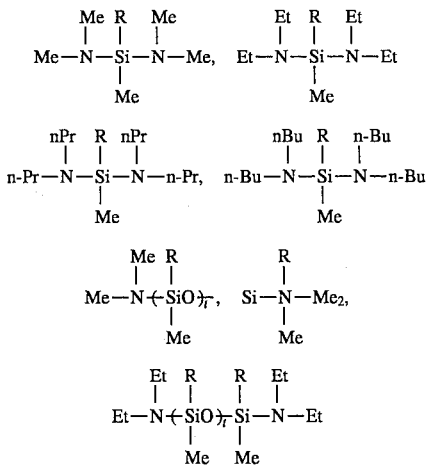

wherein in the formulas above R represents a methyl group, a vinyl group, a trifluoropropyl group, or a phenyl group, and t' is an integer of 1 to 100.

In the above-mentioned specific examples, Me represents a methyl group, Et represents an ethyl group, Pr represents a propyl group, and Bu represents a butyl group.

In the above-described silanes or siloxanes, generally there is a tendency that those having a lower degree of polymerization are high in catalytic activity and preferably q, r, s, and t in the general formulas (3) to (6) are each 10 or less. Further, in the present invention, the silanes and siloxanes represented by the general formula (6) are most preferably used.

The organopolysiloxane and the above silane or siloxane that are used in such a ratio that the molar ratio of the silanol group to the hydrolyzable group is from 0.5 to 3.0, particularly from 0.8 to 1.5. The reaction temperature is generally set in the range of 25° to 200° C. and desirably the reaction time is of the order from several hours to several days. In this case, if, as the above silane or siloxane, a volatile silane or siloxane is used, it is possible that after the condensation is carried out at room temperature to a certain extent, the reaction is continued by heating to 150° to 180° C. to obtain a high molecular organosiloxane having the intended molecular weight quickly.

The thus obtained high molecular organosiloxane is substantially equivalent to the organopolysiloxane used as a raw material in the content of low-molecular siloxanes, which has a degree of polymerization of 3 to 25, for example, and normally contains such low molecular siloxanes in an amount of 5,000 ppm or less, because almost no low molecular siloxanes are by-produced in the reaction. In particular in the case where the content of low-molecular siloxanes in the organopolysiloxane that is a raw material is very low, the amount of low-molecular siloxanes in the obtained high molecular organosiloxane becomes 2,000 ppm or less.

Further in the present invention, the high molecular organosiloxane obtained above may be used after reacting it with an end blocking agent to block its molecular ends with a triorganosilyl group and even if such end blocking is carried out, the content of low-molecular siloxanes does not increase, which is a great advantage of the present invention.

Such an end blocking agent includes, for example, an organosilicon compound represented by the following general formula (7):

wherein a is 1 or 2, $R^{11}$, $R^{12}$ and $R^{13}$, which are the same or different, each represent an unsubstituted or substituted monovalent hydrocarbon group, and Z represents a hydroxyl group, a halogen atom, $-N^{14}R^{15}$ or $>NX$ in which $R^{14}$ and $R^{15}$, which are the same or different, each represent an unsubstituted or substituted monovalent hydrocarbon group and X represents a hydrogen atom or an unsubstituted or substituted monovalent hydrocarbon group.

In the general formula (7), examples of the monovalent hydrocarbon groups $R^{11}$ to $R^{15}$ are the same groups as those mentioned as examples of $R^1$ in the above general formula (1) and as X, a hydrogen atom, a lower alkyl group having 5 or less carbon atoms, and a cycloalkyl group are preferable. Typical examples of the above organosilicon compound include the following:

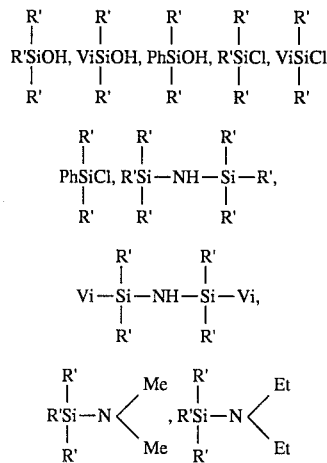

In the above formulas, R' represent a lower alkyl group having 5 or less carbon atoms, such as a methyl group, an ethyl group, and a propyl group, Vi represents a vinyl group, and Ph represents a phenyl group.

The blocking of the ends of the high molecular organosiloxane with the above organosilicon compound can be carried out easily by mixing the organosilicon compound with the high molecular organosiloxane. The mixing is performed by using a mixer, such as a kneader or a planetary mixer, and as the mixing temperature, normal temperatures are enough, but if the reactivity is low, the mixing can be carried out with the mixture heated to the decomposition limit temperature of the end blocking agent, i.e., the above organosilicon compound, as required. The mixing time is generally of the order of 0.5 to 3 hours, particularly of the order or 0.5 to 1 hour. The amount of the organosilicon compound to be used is preferably in the range of 0.01 to 5 parts by weight, particularly in the range of 0.05 to 3 parts by weight, per 100 parts by weight of the high molecular organosiloxane. If that amount is less than 0.01 part by weight, it is difficult to block the ends effectively, and on the other hand if the amount to be used is more than 5 parts by weight, there is a fear that it causes the formation of low-molecular siloxanes. After the completion of the reaction, by heating and stripping the excess organosilicon compound, a high molecular organosiloxane whose ends are blocked with a triorganosilyl group can be obtained.

The high molecular weight organosiloxane of (A) preferably has a polymerization degree of at least 3,000.

Component (B)

In the silicone rubber composition of the present invention, Component (B), a finely divided silica, is blended for the purpose, for example, of reinforcing or thickening the silicone rubber, improving the workability thereof, or filling it. Examples of the finely divided silica includes fumed silica, wet process silica, fumed silica or wet process silica whose surface has been treated to be made hydrophobic, quartz finely divided powder, and diatomaceous earth, which may contain a small amount of other filler, such as calcium silicate, calcium carbonate, carbon black, glass fiber, and preferably the specific surface area of them is 1 $m^2/g$ or more, more preferably 50 $m^2/g$ or more.

Preferably this finely divided silica is used in an amount of 10 to 300 parts by weight, particularly 25 to 200 parts by weight, per 100 parts by weight of the above-mentioned Component (A), the organopolysiloxane. If that amount is less than 10 parts by weight, the intended reinforcing property, for example, cannot be secured and the workability, for example, becomes unsatisfactory while if the amount is more than 300 parts by weight, there is a fear that the workability including the mold flowability and the extrudability lowers extremely.

Component (C)

Component (C) is a curing agent for curing Component (A) that is an organopolysiloxane to form a rubberlike elastic cured product and, as Component (C), for example, an organic peroxide and an organohydrogenpolysiloxane having two or more silicon-bonded hydrogen atoms in the molecule can be used.

The above organic peroxide include, for example, benzoyl peroxide, monochlorobenzyol peroxide, p-methylbenzoyl chloride, 2,4-dichlorobenzoyl peroxide, t-butyl perbenzoate, dicumyl peroxide, 2,5-bis-(t-butylperoxy)-2,5-dimethylhexane, 2,5-bis-(t-butylperoxy)- 2,5-dimethylhexyne, dimyristyl peroxydicarbonate, dicyclododecyl peroxydicarbonate, t-butyl monoperoxycarbonate, and a compound represented by the following formula:

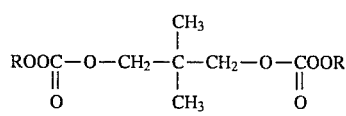

wherein R represents a monovalent hydrocarbon group having 3 to 10 carbon atoms.

The above-described curing agent is used in an amount of 0.5 to 5 parts by weight per 100 parts by weight of the above-mentioned Component (A) that is an organopolysiloxane.

The organohydrogenpolysiloxane is used in the case where the above-mentioned Component (A) that is an organopolysiloxane has alkenyl groups, and the addition reaction of said alkenyl groups with the SiH groups forms a cured product. As that organohydrogenpolysiloxane, organohydrogenpolysiloxanes conventionally used in curable compositions that are cured by that kind of addition reaction can be used, and its viscosity (degree of polymerization), the organic groups bonded to the silicon atoms, etc. can be suitably determined depending upon the application of the composition. Preferably the organohydrogenpolysiloxane is used in such way that the molar ratio of the SiH group to the alkenyl group is from 0.5 to 5.

In the case where the organohydrogenpolysiloxane is used as a curing agent, preferably a curing catalyst for promoting said addition reaction is used. Such a curing catalyst includes, for example, a platinum family metal catalyst, such as a platinum catalyst, a palladium catalyst, and a rhodium catalyst, and generally a platinum catalyst, such as platinum black, chloroplatinic acid, a complex of chloroplatinic acid with an olefin or a vinyl siloxane, and an alcohol solution of chloroplatinic acid, is preferably used. These curing catalyst is generally used in an amount of 0.5 to 500 ppm, particularly 2 to 200 ppm, based on Component (A) that is an organopolysiloxane.

For example, in a case wherein Component (A) that is an organopolysiloxane contains hydroxyl groups partially remained in the molecule, besides the above organic peroxides and organohydrogenpolysiloxanes, a condensation-reactive crosslinking agent, such as a silane and a siloxane having hydrolyzable groups in the molecule, can be used as a curing agent.

If a condensation-reactive crosslinking agent is used, a suitable amount of a condensation reaction catalyst, such as an organotin compound and an organotitanium compound, can be used.

Other components

Although the present silicone rubber composition contains the above-described Components (A) to (C) as essential components, in addition to them, additives known per se can be blended unless they do not harm the purpose of the present invention of reducing the content of low-molecular siloxanes. For example, a dispersant, such as a low-molecular siloxane having a degree of polymerization of 100 or less, a silanol group-containing silane, and an alkoxy group-containing silane, a heat resistance improver, such as iron oxide, cesium oxide, iron octylate, and titanium oxide, a colorant, such as various pigments, and a fire retardant auxiliary, such as a platinum compound and a palladium compound, can be suitably blended. Incidentally, if a low-molecular siloxane is used as a dispersant, preferably low-molecular siloxanes having a degree of polymerization of 3 to 25 contained in that low-molecular siloxane component are removed previously.

The Silicone Rubber Composition

The silicone rubber composition of the present invention can be easily obtained by mixing uniformly the above-described components. The mixing can be carried out easily by using, for example, a dough mixer, a kneader mixer, or a Banbury mixer. In this case, heat treatment may be carried out, if necessary, to disperse the components uniformly. Generally it is sufficient that the heat treatment is carried out at a temperature of 100° to 250° C. for about 30 min to 6 hours. Incidentally, if heat treatment is carried out, it is recommended that Component (B), the curing agent, is mixed after the heat treatment.

The thus obtained silicone rubber composition has such an advantage that the content of low-molecular siloxanes is remarkably low, and it is used particularly effectively in the application wherein low-molecular siloxanes are obnoxious, for example, in the application of electrical contacts and parts used adjacent thereto, rolls of copying machines, gaskets for construction, etc. In this case, the silicone rubber composition is molded through conventional molding steps into the shape of a product, and as the molding means, any of various molding means can be used, such as pressure molding, extrusion, injection molding, transfer molding, and calender molding. Although the curing conditions vary depending, for example, on the curing agent to be used, generally, heat treatment at 100° to 350° C. for about 1 to 30 min is sufficient. Further, if necessary, secondary curing may be carried out at 100° to 250° C. for about 1 to 8 hours.

EXAMPLES

In the following Examples, D represents the degree of polymerization and, for example, D 25 indicates a degree of polymerization of 25.

Synthetic Example 1

500 g of a dimethylpolysiloxane of which both ends are terminated with silanol groups (the content of the silanol groups: 0.0195 mol/500 g; the average polymerization degree: about 700; and the content of low-molecular siloxanes (D 3 to D 25): 654 ppm) and 1.42 g of bis(dimethylamino)dimethylsilane (the content of dimethylamino groups: 0.0195 mol) were charged into a separable flask and were stirred at room temperature for 1 hour, then the temperature was elevated to 180° C., and the condensation polymerization was carried out for 2 hours with stirring.

The average degree of polymerization of the obtained high molecular organosiloxane was $7.5\times10^3$ and the content of low-molecular siloxanes (D 3 to D 25) was 654 ppm.

Synthetic Example 2

Synthetic Example 1 was repeated, except that 500 g of a dimethylpolysiloxane of which both ends are terminated with silanol groups (the content of the silanol groups: 0.195 mol/500 g; the average polymerixation degree: about 70; and the content of low-molecular siloxanes (D 3 to D 25): 1800 ppm) and 21.1 g of bis(methylethylamido)dimethylsilane (the content of methylethylamido groups: 0.195 mol) were used, thereby preparing a high molecular organosiloxane.

The average degree of polymerization of the obtained high molecular organosiloxane was $4.2\times10^3$ and the content of low-molecular siloxanes (D 3 to D 25) was 1560 ppm.

Synthetic Example 3

Synthetic Example 1 was repeated, except that 500 g of a methylvinylpolysiloxane of which both ends are terminated with silanol groups (the content of the vinyl methylsiloxane units: 0.5 mol %; the content of the silanol groups: 0.195 mol/500 g; the average polymerization degree: about 70; and the content of low-molecular siloxanes (D 3 to D 25): 1800 ppm) and 37.4 g of bis(diethylaminoxy)hexamethyltetracyclosiloxane (the content of diethylaminoxy groups: 0.195 mol) were used, thereby preparing a high molecular organosiloxane.

The average degree of polymerization of the obtained high molecular organosiloxane was 5.6×10³ and the content of low-molecular siloxanes (D 3 to D 25) was 1982 ppm.

Synthetic Example 4

500 g of octamethylcyclotetrasiloxane was charged into a separable flask, and after the temperature was elevated to 170° C., 0.01 g of a 10% paste (10% potassium siliconate) of potassium hydroxide and dimethylhigh molecular organosiloxane was added, and the resulting mixture was stirred for 2 hours to carry out the polymerization, thereby obtaining a high molecular organosiloxane.

The average degree of polymerization of the obtained high molecular organosiloxane was 8.2×10³ and the content of low-molecular siloxanes (D 3 to D 25) was 48,521 ppm.

Synthetic Example 5

500 g of a methylvinylpolysiloxane of which both ends are silanols (the content of the vinyl methylsiloxane units: 0.5 mol %; the content of the silanol groups: 0.01195 mol/500 g; the average polymerization degree: about 1,200; and the content of low-molecular siloxanes (D 3 to D 25): 654 ppm) was charged into a separable flask, and after the temperature was elevated to 170° C., 0.01 g of a 10% paste (10% potassium siliconate) of potassium hydroxide and dimethylhigh molecular organosiloxane was added, and the resulting mixture was stirred for 2 hours to carry out the polymerization, thereby obtaining a high molecular organosiloxane.

The average degree of polymerization of the obtained high molecular organosiloxane was 1.9×10³ and the content of low-molecular siloxanes (D 3 to D 25) was 40,520 ppm.

Synthetic Example 6

Synthetic Example 1 was repeated, except that 500 g of the dimethylpolysiloxane of which both ends are terminated with silanol groups (the content of the silanol groups: 0.0195 mol/500 g; the average polymerization degree: about 700; and the content of low-molecular siloxanes (D 3 to D 25): 654 ppm), 1.42 g of the bis(dimethylamino)dimethylsilane and 0.4 g of dimethylaminotrimethylsilane were charged into a separable flask and were stirred at room temperture for 1 hour. Then the temperature was elevated to 180° C., and condensation polymerization was carried out for 2 hours with stirring.

The average degree of polymerization of the obtained gum was 6.9×10³ and the content of low-molecular siloxanes (D 3 to D 25) was 662 ppm.

Examples 1 to 4 and Comparative Examples 1 and 2

100 parts by weight of the high molecular organosiloxane obtained in each of the above Synthetic Examples, 3 parts by weight of diphenylsilanediol (dispersant), 4 parts by weight of a dimethylpolysiloxane of which both ends are terminated with silanol groups (degree of polymerization: 10), and 40 parts by weight of fumed silica (Aerozil 200 manufactured by Nippon Aerozil) were kneaded together by a twin roll and then were heat-treated for 4 hours to prepared a base compound.

100 parts by weight of this base compound and 1.5 parts by weight of 2,4-dichlorobenzoyl peroxide (curing agent) were mixed and after the resulting mixture was press-cured at 120° C. for 10 min, the mixture was secondarily cured at 150° C. for 1 hour to obtain a cured sheet having a thickness of 2 mm.

The content of low-molecular siloxanes in the cured sheet and the physical properties of the sheet were measured, the results being shown in Table 1. Incidentally, the physical properties of the sheet were measured in accordance with JIS K-6301.

TABLE 1

| Siloxane gum | Example 1 Synthetic Example 1 | Example 2 Synthetic Example 2 | Example 3 Synthetic Example 3 | Example 4 Synthetic Example 6 | Comp. Ex. 1 Synthetic Example 4 | Comp. Ex. 2 Synthetic Example 5 |
|---|---|---|---|---|---|---|
| D3 to D25 in siloxane gum | 654 ppm | 1,560 ppm | 1,982 ppm | 662 ppm | 48,521 ppm | 40,520 ppm |
| D3 to D25 in cured sheet | 470 ppm | 2,100 ppm | 2,250 ppm | 476 ppm | 34,575 ppm | 30,150 ppm |
| Physical properties | | | | | | |
| Hardness | 48 | 47 | 53 | 49 | 47 | 52 |
| Tensile strength (kgf/cm²) | 101 | 103 | 97 | 110 | 98 | 93 |
| Elongation (%) | 450 | 470 | 420 | 465 | 465 | 440 |

Further, the cured sheet was cut into a strip having a length of 20 cm, the strip was firmly secured to a white board made from asbestos and cement by screws, the white board was fixed to an outdoor exposure apparatus having an inclination of 45°, and the change of soil with time was visually observed. The results are shown in Table 2. Incidentally, the degree of soil was evaluated on a 1–5 scale, 0 indicating least soil and an increased rate indicating increased soil.

TABLE 2

| | Example | | | Comp. Ex. | |
|---|---|---|---|---|---|
| Period | 1 | 2 | 3 | 1 | 2 |
| 1 month | 0 | 0 | 0 | 1 | 1 |
| 2 months | 0 | 0 | 0 | 2 | 2 |
| 3 months | 0 | 0 | 0 | 3 | 4 |
| 4 months | 0 | 0 | 0 | 4 | 4 |
| 5 months | 0 | 0 | 0 | 4 | 5 |
| 6 months | 0 | 0 | 0 | 5 | 5 |
| 12 months | 0 | 0 | 0 | 5 | 5 |

We claim:
1. A silicone rubber composition, comprising
(A) a chain-extended organopolysiloxane containing low molecular weight cyclic siloxane having a degree of polymerization of 3 to 25 in an amount of 5,000. ppm or less, obtained by condensation polymerization by mixing and heating an organopolysiloxane having a silanol group at both ends of the molecular chain represented by formula (1):

 (1)

wherein $R^1$ and $R^2$, which are the same or different, each represent an unsubstituted monovalent hydrocarbon group or monovalent hydrocarbon group substituted with halogen or cyano and n is an integer of 2 to 3,000, with at least one member selected from the group consisting of a silane and a siloxane each having a total of two hydrolyzable groups in the molecule, (B) a finely divided silica, and
(C) a curing agent.

2. A silicone rubber composition as claimed in claim 1, wherein, in said organopolysiloxane, Component (A), the total content of low-molecular siloxanes having a degree of polymerization of 25 or less is 5,000 ppm or less.

3. A silicone rubber composition as claimed in claim 1, wherein the hydrolyzable group possessed by said silane or said siloxane is a dialkylamino group, an amide group or an ester group.

4. A silicone rubber composition as claimed in claim 1, wherein a mixture of said organopolysiloxane represented by the general formula (1) and said silane or said siloxane is heated to a temperature of 25° to 200° C.

5. A silicone rubber composition as claimed in claim 1, wherein wherein Component (B) is present in an amount of 10 to 300 parts by weight per 100 parts by weight of Component (A).

6. A silicone rubber composition as claimed in claim 1, wherein Component (C) is an organic peroxide or an organohydrogenpolysiloxane having two or more silicon-bonded hydrogen atoms in the molecule.

7. A silicone rubber composition, comprising
(A) a chain-extended organopolysiloxane containing low molecular weight cyclic siloxane having a degree of polymerization of 3 to 25 in an amount of 5,000 ppm or less and blocked at both terminal ends with a triorganosilyl group, obtained by condensation polymerization by mixing and heating an organopolysiloxane having a silanol group at both ends of the molecular chain represented by formula (1):

 (1)

wherein $R^1$ and $R^2$, which are the same or different, each represent an unsubstituted monovalent hydrocarbon group or monovalent hydrocarbon group substituted with halogen or cyano and n is an integer of 2 to 3,000, with at least one member selected from the group consisting of a silane and a siloxane each having a total of two hydrolyzable groups in the molecule, and thereafter blocking the molecular ends of the resulting product with a triorganosilyl group, (B) a finely divided silica, and
(C) a curing agent.

8. A silicone rubber composition according to claim 1 or claim 7 wherein the organopolysiloxane of formula (1) and said member are used in such a ratio that the molar ratio of the silanol group to the hydrolyzable group is in the range of 0.5 to 3.0.

9. A silicone rubber composition as claimed in claim 1, wherein said silane or said siloxane comprises at least one compound selected from the group of compounds represented by the following general formulas (3) to (6):

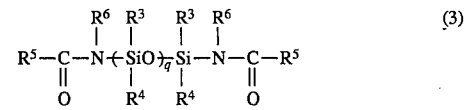 (3)

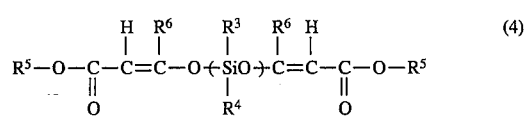 (4)

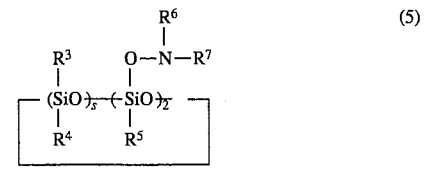 (5)

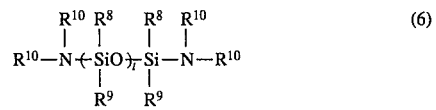 (6)

wherein in the formulas (3) to (6) q is an integer of 0 to 100, r is an integer of 1 to 100, s is an integer of 2 to 10, t is an integer of 0 to 1,000, and $R^3$ to $R^{10}$ which are the same or different, each represent an unsubstituted or substituted monovalent hydrocarbon group.

* * * * *